United States Patent
Noyes et al.

(10) Patent No.: US 8,068,148 B2
(45) Date of Patent: Nov. 29, 2011

(54) AUTOMATIC FLICKER CORRECTION IN AN IMAGE CAPTURE DEVICE

(75) Inventors: Ying Noyes, San Diego, CA (US); Jingqiang Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1666 days.

(21) Appl. No.: 11/327,824

(22) Filed: Jan. 5, 2006

(65) Prior Publication Data

US 2007/0153094 A1    Jul. 5, 2007

(51) Int. Cl.
*H04N 9/73* (2006.01)
(52) U.S. Cl. .................................. 348/226.1
(58) Field of Classification Search ............. 348/226.1
See application file for complete search history.

(56) References Cited

U.S. PATENT DOCUMENTS

| | | | | |
|---|---|---|---|---|
| 5,473,375 | A * | 12/1995 | Takayama et al. | 348/364 |
| 5,960,153 | A * | 9/1999 | Oster et al. | 386/200 |
| 6,271,884 | B1 * | 8/2001 | Chung et al. | 348/370 |
| 6,710,818 | B1 * | 3/2004 | Kasahara et al. | 348/607 |
| 6,771,305 | B2 * | 8/2004 | Smith et al. | 348/84 |
| 7,187,405 | B2 * | 3/2007 | Poplin et al. | 348/226.1 |
| 7,656,436 | B2 * | 2/2010 | Kinoshita et al. | 348/226.1 |
| 2004/0201729 | A1 * | 10/2004 | Poplin et al. | 348/226.1 |
| 2005/0237394 | A1 * | 10/2005 | Katiblan et al. | 348/226.1 |
| 2006/0279641 | A1 * | 12/2006 | Takahashi et al. | 348/226.1 |
| 2007/0065102 | A1 * | 3/2007 | Laughlin | 386/95 |

FOREIGN PATENT DOCUMENTS

| | | |
|---|---|---|
| EP | 1324598 | 7/2003 |
| EP | 1566962 | 8/2005 |
| KR | 200575425 | 7/2005 |

OTHER PUBLICATIONS

International Search Report—PCT/US07/060182—International Search Authority—European Patent Office—Nov. 8, 2007.
Anonymous: "Newton's method" Wikipedia, Online Dec. 30, 2005, XP002456638.
"Solving Higher-degree or transcendental equations by expanding the inverse functions in multinomial forms," Wang Xiao-ming, WenZhou Vocational and Technical College, WenZhou, 325035, China. Dec. 31, 2002.
Written Opinion PCT/US2007/060182—International Search Authority European Patent Office—Nov. 8, 2007.

* cited by examiner

*Primary Examiner* — Lin Ye
*Assistant Examiner* — Amy Hsu
(74) *Attorney, Agent, or Firm* — Timothy F. Loomis; James R. Gambale, Jr.

(57) ABSTRACT

The disclosure describes flicker detection and correction techniques to improve the quality of captured imagery, such as video or still images. In particular, this disclosure describes flicker correction techniques that compare different image frames to detect flicker. In some embodiments, the comparisons involves summing intensity values associated with rows within the frames and comparing the row sums to generate a difference signal. Detection and correction of flicker may be performed using a first derivative of the difference signal. The first derivative of the difference signal can be used in variety of ways to detect and correct flicker.

40 Claims, 7 Drawing Sheets

AUTOMATIC FLICKER CORRECTION IN AN IMAGE CAPTURE DEVICE

TECHNICAL FIELD

This disclosure relates to image capture devices and, more particularly, correction of flicker within image capture devices.

BACKGROUND

Image capture devices, such as digital video cameras or digital still photo cameras, are used in different applications and environments. An image capture device should be capable of producing high quality imagery under a variety of lighting conditions. For example, image capture devices should be capable of operating effectively in environments illuminated by natural light, such as outdoor environments, as well as in environments illuminated by incandescent or fluorescent lights, such as indoor environments.

In an indoor environment, however, fluctuations in the intensity of indoor lighting can degrade the quality of the captured image. The fluctuations are a function of the alternating current (AC) electrical power frequency of the indoor lighting source. A solid state image capture device, such as a complementary metal oxide semiconductor (CMOS) device, includes an array of image sensors that do not instantaneously capture all of the image information used to record a frame. Consequently, fluctuations in light intensity during image capture cause portions of an image frame to exhibit different intensity levels, resulting in visible bands in the image. This banding phenomenon is commonly referred to as flicker.

Flicker may be eliminated by setting the integration time of the image capture device to an integer multiple of the period of the illumination source. The integration time refers to the time limit for the sensor array to capture light for each frame. Typically, flicker is more severe for shorter integration times. Variations in the AC power frequency of indoor lighting exist throughout the world. Some countries use 60 Hertz (Hz) power, for example, while other countries use 50 Hz power. A 60 Hz illumination source causes banding at 120 Hz, while a 50 Hz illumination source causes banding at 100 Hz. Some countries use both 50 and 60 Hz AC power, even within the same building in some instances.

Flicker may occur when the image capture device is used in an environment in which the illumination source is operating at a frequency other than an anticipated frequency. For instance, if the integration time of the image capture device is set as an integer multiple of the period of a 60 Hz illumination source, flicker can occur when capturing imagery in a 50 Hz illumination environment, and vice versa.

SUMMARY

This disclosure describes automatic flicker detection and correction techniques to improve the quality of captured imagery, such as video or still images. In particular, this disclosure describes flicker correction techniques that compare different image frames to detect flicker. In some embodiments, the comparison involves summing intensity values associated with rows within the frames and comparing the row sums to generate a difference signal. Detection and correction of flicker may be performed using a first derivative of the difference signal. The first derivative of the difference signal can be used in a variety of ways to detect and correct flicker.

For example, a flicker correction unit may determine the operating frequency of an illumination source based on the first derivative of the difference signal, and then correct the flicker based on the determined frequency. In this case, the flicker correction unit computes distances between zero crossing points of the first derivative of the difference signal, and determines the frequency of the illumination source based on the computed distances. The flicker correction unit then corrects the flicker based on the determined illumination source frequency. For example, the flicker correction unit may adjust an integration time of a sensor array in the image capture device to an integer multiple of the period of the illumination source, as determined by the detected frequency.

As an alternative, the flicker correction unit may identify a periodic pattern indicative of the presence of flicker, and correct the flicker upon identifying the periodic pattern. In this case, the image capture device may compute distances between zero crossing points of the first derivative of the difference signal. Based on a standard deviation of the distances between the zero crossing points, the flicker correction unit determines that a periodic pattern indicative of flicker exists, e.g., when the standard deviation is less than a threshold value. When a periodic pattern exists, the image capture device may set an integration time to an integer multiple of the period of a first possible illumination source, e.g., at 60 Hz. If the periodic pattern continues to exist, the image capture device resets the integration time to an integer multiple of the period of a second possible illumination source, e.g., at 50 Hz. In this case, there is no need to determine the actual frequency of the illumination source.

In one embodiment, the disclosure provides a method comprising comparing a first image frame captured by an image capture device to a second image frame captured by the image capture device, generating a difference signal based on the comparison, computing a derivative of the difference signal, and correcting flicker in a third image frame captured by the image capture device based on the derivative.

In another embodiment, the disclosure provides a device comprising an image sensor array that captures a first image frame and a second image frame, a flicker correction unit that compares the first image frame to the second image frame, generates a difference signal based on the comparison, computes a derivative of the difference signal, and corrects flicker in a third image frame captured by the sensor array based on the derivative.

In an additional embodiment, the disclosure provides a method comprising comparing a first image frame captured by an image capture device to a second image frame captured by the image capture device, generating a first difference signal based on the comparison of the first and second image frames, detecting flicker in the first and second image frames based on the difference signal. adjusting an integration time of the image capture device to an integer multiple of a period of a first illumination source if flicker is detected in the first and second image frames, comparing a third image frame captured by the image capture device to a fourth image frame captured by the image capture device after adjustment of the integration time, generating a second difference signal based on the comparison of the third and fourth image frames, detecting flicker in the third and fourth image frames based on the second difference signal, and adjusting the integration time of the image capture device to an integer multiple of a period of a second illumination source if flicker is detected in the third and fourth image frames.

In a further embodiment, the disclosure provides a device comprising an image sensor array that captures a first image frame and a second image frame. and a flicker correction unit that compares the first image frame to the second image frame captured, generates a first difference signal based on the comparison of the first and second image frames, detects flicker in the first and second image frames based on the difference signal, and adjusts an integration time of the image sensor array to an integer multiple of a period of a first illumination source if flicker is detected in the first and second image frames, wherein the image sensor array captures a third image frame and a fourth image frame after adjustment of the integration time, and the flicker correction unit compares the third and fourth image frames, generates a second difference signal based on the comparison of the third and fourth image frames, detects flicker in the third and fourth image frames based on the second difference signal, and adjusts the integration time of the image capture device to an integer multiple of a period of a second illumination source if flicker is detected in the third and fourth image frames.

In another embodiment, the disclosure provides a method comprising comparing a first image frame captured by an image capture device to a second image frame captured by the image capture device, generating a difference signal based on the comparison, applying a low pass filter to the difference signal, computing a first derivative of the filtered difference signal, and correcting flicker in a third image frame captured by the image capture device based on the first derivative of the filtered difference signal.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
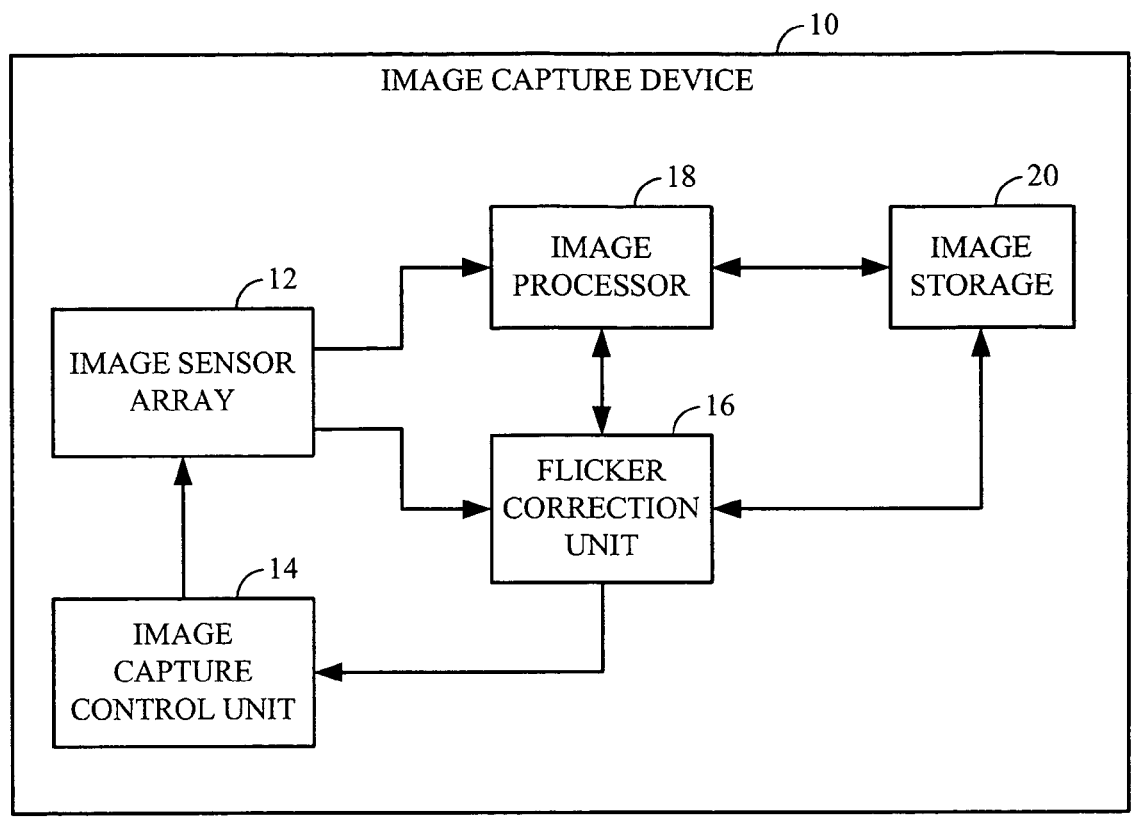
FIG. 1 is a block diagram illustrating an exemplary image capture device for capturing image information.

FIG. 1 is a block diagram illustrating an exemplary image capture device 10 for capturing image information. As shown in FIG. 1, image recording device 10 includes an image sensor array 12, an image capture control unit 14, a flicker correction unit 16, an image processor 18, and an image storage device 20. The features illustrated in FIG. 1 may be realized by any suitable combination of hardware and/or software components. Depiction of different features as units is intended to highlight different functional aspects of image capture device 12, and does not necessarily imply that such units must be realized by separate hardware and/or software components. Rather, functionality associated with one or more units may be integrated within common hardware and/or software components.

Image capture device 10 may be a digital camera, such as a digital video camera, a digital still image camera, or a combination of both. In addition, image capture device 10 may be a stand-alone device, such as a stand-alone camera, or be integrated in another device, such as a wireless communication device. As an example, image capture device 10 may be integrated in a mobile telephone to form a so-called camera phone. Image capture device 10 preferably is equipped to capture color imagery, black-and-white imagery, or both. In this disclosure, the terms "image," "imagery," "image information," or similar terms may interchangeably refer to either video or still pictures. Likewise, the term "frame" may refer to either a frame of video or a still picture frame obtained by image capture device 10.

Sensor array 12 acquires image information for a scene of interest. Sensor array 12 includes a two-dimensional array of individual image sensors, e.g., arranged in rows and columns. Sensor array 12 may comprise, for example, an array of solid state sensors such as complementary metal-oxide semiconductor (CMOS) sensors. The image sensors within sensor array 12 are sequentially exposed to the image scene to capture the image information. Image capture device 10 sets an integration time for sensor array 12, limiting the amount of time to which the sensor array is exposed to light for capture of a given frame. Sensor array 12 provides captured image information to image processor 18 to form one or more frames of image information for storage in image storage device 20.

The solid state sensors in sensor array 12 do not instantaneously capture all of the image information used to record a frame. Instead, the sensors are sequentially scanned to obtain the overall frame of image information. As a result, indoor lighting can produce visible banding, referred to as flicker, in the images obtained by sensor array 12. The integration time of sensor array 12 can be controlled to eliminate flicker caused by an illumination source operating at a given AC frequency. In particular, the integration time may be adjusted to be an integer multiple of a period of the illumination source. However, the frequency of illumination sources can be different, e.g., either 50 Hz or 60 Hz. Accordingly, the integration time required to eliminate flicker may vary according to the environment in which image capture device 10 is used.

Capture control unit 14 controls sensor array 12 to capture the image information in the form of one or more frames. Specifically, capture control unit 14 controls the exposure of sensor array 12 to the image scene based on a selected integration time and frame rate. The frame rate at which sensor array 12 captures frames may be controlled to ensure that the flicker "rolls." The flicker "rolls" when the positions of bands change slightly from frame to frame. If the flicker does not roll, the flicker appears as if it is a still image. To ensure that the flicker rolls, the frame rate should be set to a value such that the flicker frequency is not divisible by the frame rate. In a lighting environment characterized by a 60 Hz power source, for example, capture control unit 14 may capture image information at a frame rate slightly higher or lower than 15.00, such as at a frame rate of 15.03.

Capture control unit 14 may initially capture images using an integration time set to eliminate flicker in a particular lighting environment. For image recording devices sold in the United States, for example, capture control unit 14 may have a default integration time that is an integer multiple of 8.33 milliseconds (1/120), which is the period of the variation produced by a lighting environment characterized by a 60 Hz power source. As will be described in more detail below, flicker correction unit 16 may set the integration time of capture control unit 14 upon detecting the presence of flicker. In one embodiment, for example, flicker correction unit 16 sets the integration time of capture control unit 14 based on the detected frequency of an illumination source. In another embodiment, upon flicker detection, flicker correction unit 16 selects different integration times appropriate for different illumination source frequencies until the flicker is eliminated.

Image processor 18 receives the captured image data from sensor array 12 and performs any necessary processing on the image information. Processor 18 may, for example, perform filtering, cropping, demosaicing, compression, image enhancement, or other processing of the image information captured by sensor array 12. Processor 18 may be realized by a microprocessor, digital signal processor (DSP), application specification integrated circuit (ASIC), field programmable gate array (FPGA), or any other equivalent discrete or integrated logic circuitry. In some embodiments, image processor 18 may form part of an encoder-decoder (CODEC) that encodes the image information according to a particular encoding technique or format, such as MPEG-2, MPEG-4, ITU H.263, ITU H.264, JPEG, or the like.

Processor 18 stores the image information in storage device 20. Processor 18 may store raw image information, processed image information, or encoded information in storage device 20. If the imagery is accompanied by audio information, the audio also may be stored in storage device 20, either independently or in conjunction with the video information. Storage device 20 may comprise any volatile or nonvolatile memory or storage device, such as read-only memory (ROM), electrically erasable programmable read-only memory (EEPROM), or FLASH memory, or such as a magnetic data storage device or optical data storage device.

Flicker correction unit 16 detects flicker within the image information captured by sensor array 12 and corrects the flicker for subsequent images to improve image quality. As will be described in detail below, flicker correction unit 16 detects flicker within the image information using a pair of frames of image information. Flicker correction unit 16 may be implemented as an independent hardware component or as a programmable feature of a logic device, such as a microprocessor, DSP or the like. In some embodiments, flicker detection unit 16 may be a programmable or integrated feature of a logic device implementing image processor 18. In particular, flicker detection unit 16 may be implemented as one or more software processes executed by such a logic device.

Flicker correction unit 16 may perform flicker detection when image capture device 10 is initially powered on. For example, flicker correction unit 16 may initially perform flicker detection when auto exposure control (AEC) of image capture device 10 reaches a particular brightness level range. In addition, flicker correction unit 16 may periodically perform flicker detection while image capture device 10 is operating, e.g., at intervals of several seconds or minutes. As one example, flicker correction unit 16 may perform flicker detection approximately every twenty seconds. In this manner, flicker detection can be performed in the event the environment in which image capture device 10 is used has changed, which could result in the onset of flicker or a change in flicker frequency.

Flicker correction unit 16 compares two frames obtained by sensor array 12 to detect flicker. Preferably, flicker correction unit 16 compares consecutive frames, such as consecutive video frames in a video sequence or consecutive still images. However, the frames need not be consecutive. In either case, flicker correction unit 16 uses the frame comparison to either identify a periodic pattern indicative of flicker or identify the operating frequency of the illumination source. Flicker correction unit 16 sums intensity values across at least a portion of sensors in at least a portion of the rows in the sensor array 12 for both of the frames.

For example, flicker correction unit 16 may use YCbCr luminance and chrominance data produced by sensor array 12. More particularly, flicker correction unit 16 may use the Y luminance component of the YCbCr data as the intensity value for each sensor, and sum the Y values across the rows to produce row sum intensity values. The YCbCr data used by flicker correction unit 16 may be the same data used to drive a viewfinder or other display associated with image capture device 10, and may be cropped and scaled. Flicker correction unit 16 subtracts the row sums of the first frame from the corresponding row sums of the second frame to obtain a difference signal and then clip all negative values to zero. Positive values also may be clipped to zero. In some embodiments, flicker correction unit 16 may apply a low pass filter to the difference signal to remove hand jitter or motion between the frames, and thereby produce a smoothed difference signal.

Flicker correction unit 16 computes the first derivative of the filtered difference signal and locates the zero crossing points of the derivative signal. Using the zero crossing points of the derivative signal, flicker correction unit 16 determines whether a periodic pattern indicative of flicker is present in the image frames. Alternatively, flicker correction unit 16 determines the operating frequency of the illumination source using the zero crossing points of the derivative signal. Flicker correction unit 16 corrects the flicker based on these determinations. Flicker correction unit 16 may, for example, adjust the integration time of the capture control unit 14 to an integer multiple of the period of the illumination source to eliminate flicker.

Figure 2:
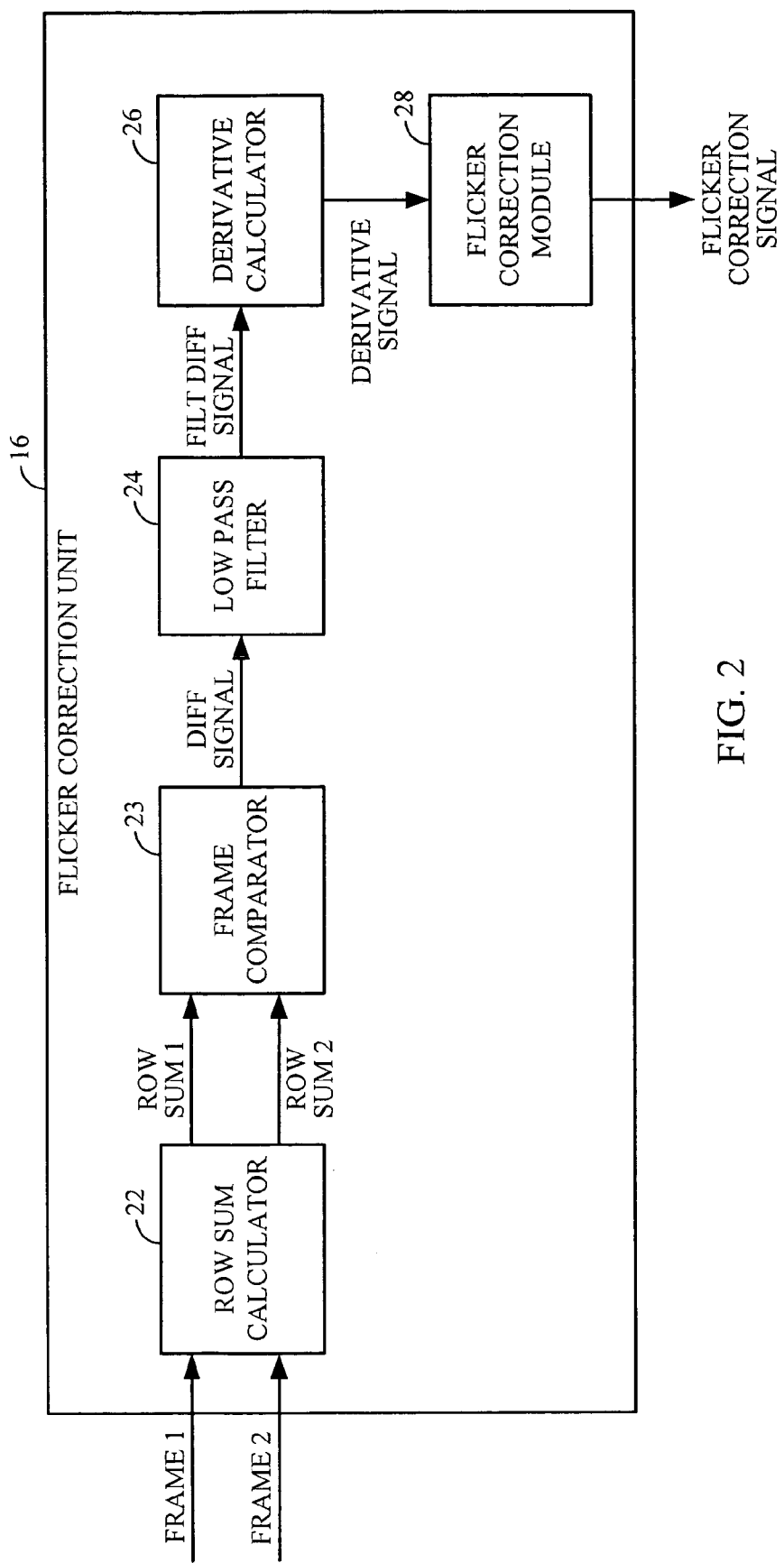
FIG. 2 is a block diagram illustrating an exemplary flicker correction unit useful with the image capture device of FIG. 1.

FIG. 2 is a block diagram illustrating an exemplary flicker correction unit 16 in more detail. Flicker correction unit 16 includes a row sum calculator 22, a frame comparator 23, a low pass filter 24, a derivative calculator 26 and a flicker correction module 28. The various components of flicker correction unit 16 may be realized by different hardware and/or software components, or common hardware and/or software components. In some embodiments, such components may be implemented as programmable functionality of a common logic device, such as a microprocessor or DSP. As described above, flicker correction unit 16 detects and corrects flicker within the image information based on a comparison of frames of image information. Flicker correction unit 16 may perform flicker detection when image capture device 10 is initially powered on, as well as periodically while image capture device 10 is operating.

Row sum calculator 22 receives intensity values for a pair of frames captured by sensor array 12 (labeled "FRAME 1" and "FRAME 2" in FIG. 2). Flicker correction unit 16 may receive the intensity values for a pair of frames directly from sensor array 12, from storage device 20, or a combination thereof. Row sum calculator 22 may process one frame at a time or process two buffered frames. For example, row sum calculator may first process FRAME 1, buffer the results, and then process FRAME 2. In one embodiment, FRAME 1 and FRAME 2 are consecutively captured frames. In some embodiments, however, the techniques described herein also may be applied for non-consecutive frames.

Row sum calculator 22 sums the sensor intensity values across at least a portion of the sensors in at least a portion of the rows in each frame (labeled "ROW SUM 1" and "ROW SUM 2" in FIG. 2). Hence, it is not necessary to sum intensity values for all rows or all sensors of sensor array 12. If row sum calculator 22 sums each of the rows of the frames output by a sensor array 12 with 1200 rows, row sum calculator 22 computes row sum data with 1200 data points. Alternatively, row sum calculator 22 may group a number of rows together and calculate a single row sum for the entire group. For a sensor array with 1200 rows, for example, row sum calculator 22 may generate groups of four rows and calculate a single row sum for each group, resulting in row sum data with 300 data points. In this case, a group of four rows is combined to produce a single row sum.

In addition, to reduce the amount of computation performed by row sum calculator 22, a portion of the rows in each of the groups may not be used in the row sum calculation. Using the four row groups described above as an example, row sum calculator 22 may sum the intensity values of the first two rows of the group and skip the other two rows of the group. As a further alternative, row sum calculator 22 may use each of the sensor outputs in the row sum calculation or may only use a portion of the sensor outputs of sensor array 12. For example, row sum calculator 22 may use a subset of the sensors in each row or row group of the sensor array 12. A subset of sensors corresponds to a subset of columns of sensor array 12. Row sum calculator 22 may compute the row sums serially or in parallel.

Frame comparator 23 computes the differences between the row sum values calculated by row sum calculator 22 for FRAME 1 and FRAME 2 to obtain a "difference signal" (labeled DIFF SIGNAL in FIG. 2). Specifically, frame comparator 23 subtracts row sums for FRAME 1 (ROW SUM 1) from the corresponding row sums for FRAME 2 (ROW SUM 2). Calculating the difference of the row sums of consecutive frames eliminates scene information, but maintains the flicker information. Frame comparator 23 may also clip any negative or positive portion of the difference signal to zero.

As further shown in FIG. 2, flicker correction unit 16 may apply a low pass filter 24 to the difference signal. Low pass filter 24 removes unwanted high frequency patterns from the difference signal. For example, low pass filter 24 may reduce the effects caused by hand jitter or motion between the two frames, resulting in a filtered, smoothed difference signal. Low pass filter 24 serves to smooth the difference signal to eliminate spurious information. Derivative calculator 26 computes the derivative of the filtered difference signal (labeled "FILT DIFF SIGNAL" in FIG. 2).

Flicker correction module 28 uses the first derivative signal to correct the flicker. Specifically, flicker correction module 28 locates the zero crossing points of the derivative signal, which correspond to the peak values of the filtered difference signal, and uses the zero crossing points to generate a flicker correction signal (labeled "FLICKER CORRECTION SIGNAL" in FIG. 2). The flicker correction signal is used by image capture control unit 14 to adjust the integration time of sensor array 12, and thereby eliminate the flicker.

In one embodiment, flicker correction module 28 computes the distances between the zero crossing positions and determines the frequency of the illumination source based on the computed distances. Flicker correction module 28 corrects the flicker based on the identified illumination source frequency. In particular, the flicker correction signal specifies that the integration time of capture control unit 14 (FIG. 1) is to be set to an integer multiple of the period of the illumination source. For a 60 Hz illumination source, flicker correction module 28 sets the integration time of capture control unit 14 to an integer multiple of approximately 8.33 milliseconds ($1/120$). For a 50 Hz illumination source, flicker correction module 28 sets the integration time of capture control unit 14 to an integer multiple of approximately 10 milliseconds ($1/100$).

In another embodiment, flicker correction module 28 computes the distances between the zero crossing points and the standard deviation of the distances between zero crossing points. Flicker correction module 28 determines whether a periodic pattern indicative of flicker exists based on the computations. Flicker correction module 28 may, for example, compare the standard deviation to a threshold value and determine that a periodic pattern indicative of flicker exists when the standard deviation is smaller than the threshold.

When a periodic pattern exists, flicker correction module 28 sends the flicker correction signal to set the integration time of capture control unit 14 to an integer multiple of the period of a first possible illumination source. In this case, the actual frequency of the illumination source is unknown. However, it is evident that flicker is present, and is most likely caused by either a 60 Hz or 50 Hz illumination source. Flicker correction module 28 may first send a flicker correction signal to set the integration time of capture control unit 14 to an integer multiple of the period of a 60 Hz illumination source (i.e., an integer multiple of 8.33 milliseconds). When flicker is detected, the 60 Hz illumination source is used in a first attempt to set the integration time to eliminate flicker. Alternatively, a 50 Hz illumination source may be used in the first attempt.

After setting the integration time, flicker detection module 16 determines whether a periodic pattern still exists using another pair of frames captured using the newly programmed integration time. If the standard deviation indicates that no periodic pattern exists following the initial setting of the integration time, image capture device 10 (FIG 1) continues to use that integration time. If the periodic pattern still exists, however, it can be assumed that the illumination source has a different frequency than the assumed (e.g., 60 Hz) frequency. In this case, flicker correction module 28 sets the integration time of capture control unit 14 to an integer multiple of the period of a second possible illumination source, e.g., a 50 Hz illumination source. Again, the order in which integration times are chosen for different illumination sources may be reversed, such that an integration time for a 50 Hz illumination source is tried first, followed by an integration time for a 60 Hz illumination source if flicker is still detected.

By comparing different frames to detect flicker, the techniques described in this disclosure are generally scene independent. In other words, the relatively complexity of an image scene does not significantly impact the effectiveness of flicker correction. Comparison of different frames, and especially consecutively frames acquired closely in time, suppresses scene information but emphasizes flicker information. In particular, subtraction of two consecutive or non-consecutive frames tends to remove scene information but leave flicker. For example, when banding rolls, only the flicker signal moves from frame to fame. However, scene information generally does not move, with the exception of movement of objects, e.g., hands, face or lips. The flicker correction techniques can be performed automatically without user intervention, and does not require any interruption of normal viewfinder operation in image capture device 10. Moreover, in some embodiments, operations necessary for flicker detection and correction can be performed in software without the need for additional hardware assistance.

Figure 3:
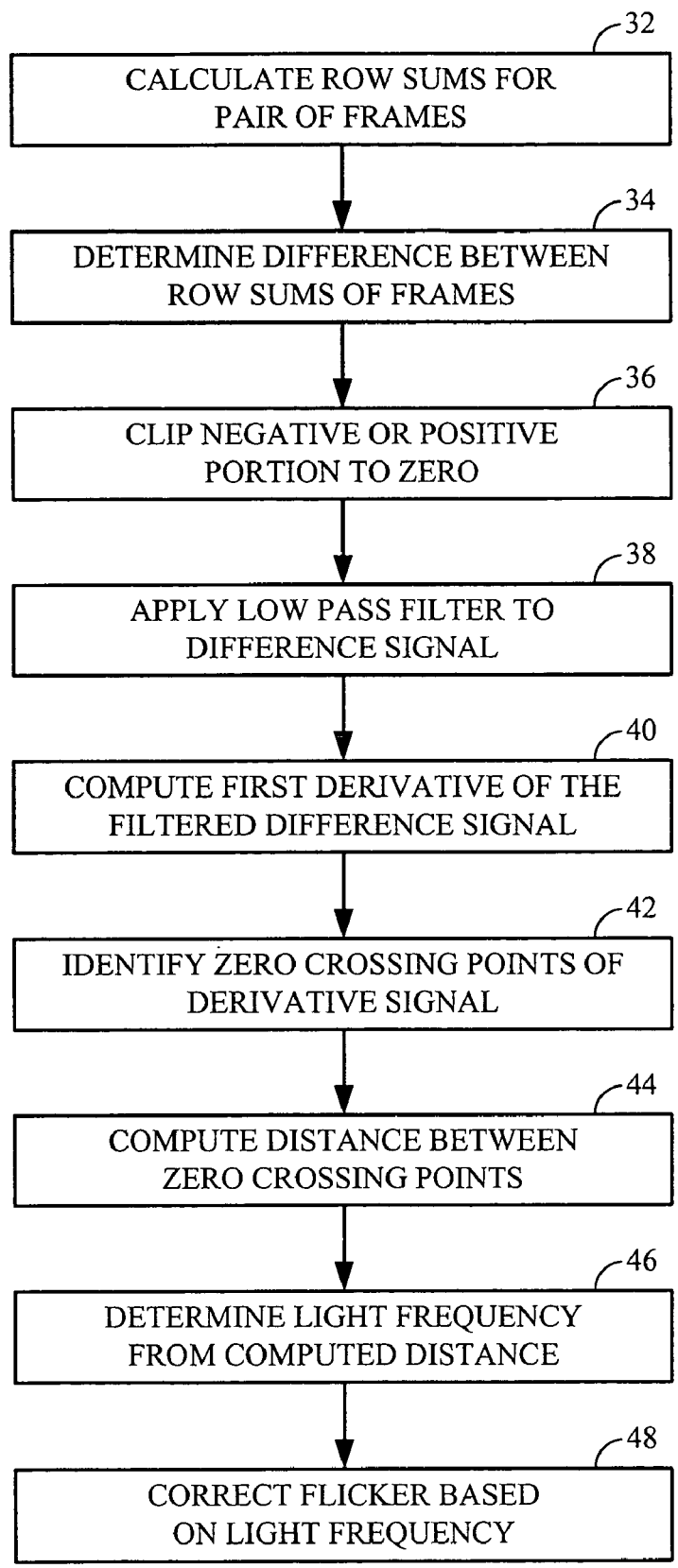
FIG. 3 is a flow diagram illustrating a technique for automatically detecting and correcting flicker.

FIG. 3 is a flow diagram illustrating an exemplary technique for detecting and correcting flicker. The technique illustrated in FIG. 3 may be performed by flicker correction unit 16 of FIG. 2. Flicker correction unit 16 and, more particularly, row sum calculator 22 processes a pair of frames captured by sensor array 12. As described above, row sum calculator 22 may receive the frames directly from sensor array 12, from processor 18 or may retrieve the frames from storage device 20 or some other buffer.

Row sum calculator 22 sums the intensity values across at least a portion of the sensors of at least a portion of the rows for both of the frames (32). Row sum calculator 22 may compute the row sums serially or in parallel. As described above, row sum calculator 22 may sum each of the rows of the frames output by sensor array 12 or group a number of rows together and calculate a single row sum for the entire group. Alternatively, or additionally, row sum calculator 20 may use all of the sensor outputs of a row in computing the row sum or may only use a portion of the sensor outputs of the row.

Frame comparator 23 determines the differences between row sums of the two frames (34). Frame comparator 23 may, for example, subtract each row sum of the first frame from the corresponding row sum of the second frame to obtain the difference signal indicating the row sum differences between the two frames. As described above, calculating the differences of the row sums of the consecutive frames eliminates scene information, while maintaining the flicker information. Flicker correction unit 16 clips the negative or positive portion of the difference signal to zero (36).

Flicker correction unit 16 applies low pass filter 24 to the difference signal generated by frame comparator 23 (38). Low pass filter 24 removes unwanted high frequency patterns from the difference signal, thus reducing the effects caused by hand jitter or motion among the two frames. Derivative calculator 26 computes the derivative of the filtered difference signal (40). Flicker correction module 28 determines the zero crossing points of the derivative signal (42) and computes the distances between the zero crossing points (44). The distances between the zero crossing positions correspond to the distances between the peak values of the filtered difference signal.

Flicker correction module 28 determines the frequency of the illumination source based on the computed distances between the zero crossing values (46). Flicker correction module 28 may, for example, calculate the frequency F of the illumination source according to the formula:

$$F = (1/(\text{peak\_distance} * \text{row\_time}))/2 \quad (1)$$

In the above formula (1), the value "peak_distance" represents the distance, in rows, between peaks of the filtered distance signal, as determined by the zero crossing points of the derivative signal. The value "row_time" represents the time required by image capture device 10 to readout an individual row, i.e., the scan time per row.

In an exemplary embodiment, the frequency F of the illumination source may be calculated according to the following formula:

$$F = ((\text{viewfinderRows} * \text{scale} + \text{croppedRows})/(\text{peak\_distance} * \text{scale} * \text{frame\_rate}))/2 \quad (2)$$

In the above formula (2), as in formula (1), the value "peak_distance" represents the distance, in rows, between peaks of the filtered distance signal, as determined by the zero crossing points of the derivative signal. The value "frame_rate" represents the rate at which frames are acquired by image capture device 10, e.g., frames per second. In formula (2), the value "viewfinderRows" represents the number of rows used by image capture device 10 to drive a viewfinder or other image display device associated with the image capture device. The number of rows used to drive the viewfinder will ordinary be less than the total number of rows in the frame obtained by image capture device 10.

The value "scale" in formula (2) represents a downsampling factor applied to the number of rows obtained by image capture device 10 to produce a viewfinder video frame. The value "croppedRows" represents the number of rows cropped from the total frame to drive the viewfinder. More particularly, the value "croppedRows" may represent the sum of the number of rows cropped that is associated with scaling, the number of rows cropped by a demosaic function, the number of rows used for VBLT (vertical blanking time), and any number of "dummy" rows that do not contain scene information. In this manner, the value "viewfinderRows*scale+croppedRows" in formula (2) represents all rows in a captured frame.

Flicker correction module 28 corrects the flicker based on the identified illumination source frequency F (48). In one embodiment, flicker correction module 28 sends a signal to set the integration time of capture control unit 14 (FIG. 1) to an integer multiple of the period of the illumination source. For example, flicker correction module 28 sets the integration time to an integer multiple of approximately 8.33 milliseconds for a 60 Hz illumination source, and to an integer multiple of approximately 10 milliseconds for a 50 Hz illumination source.

Figure 4:
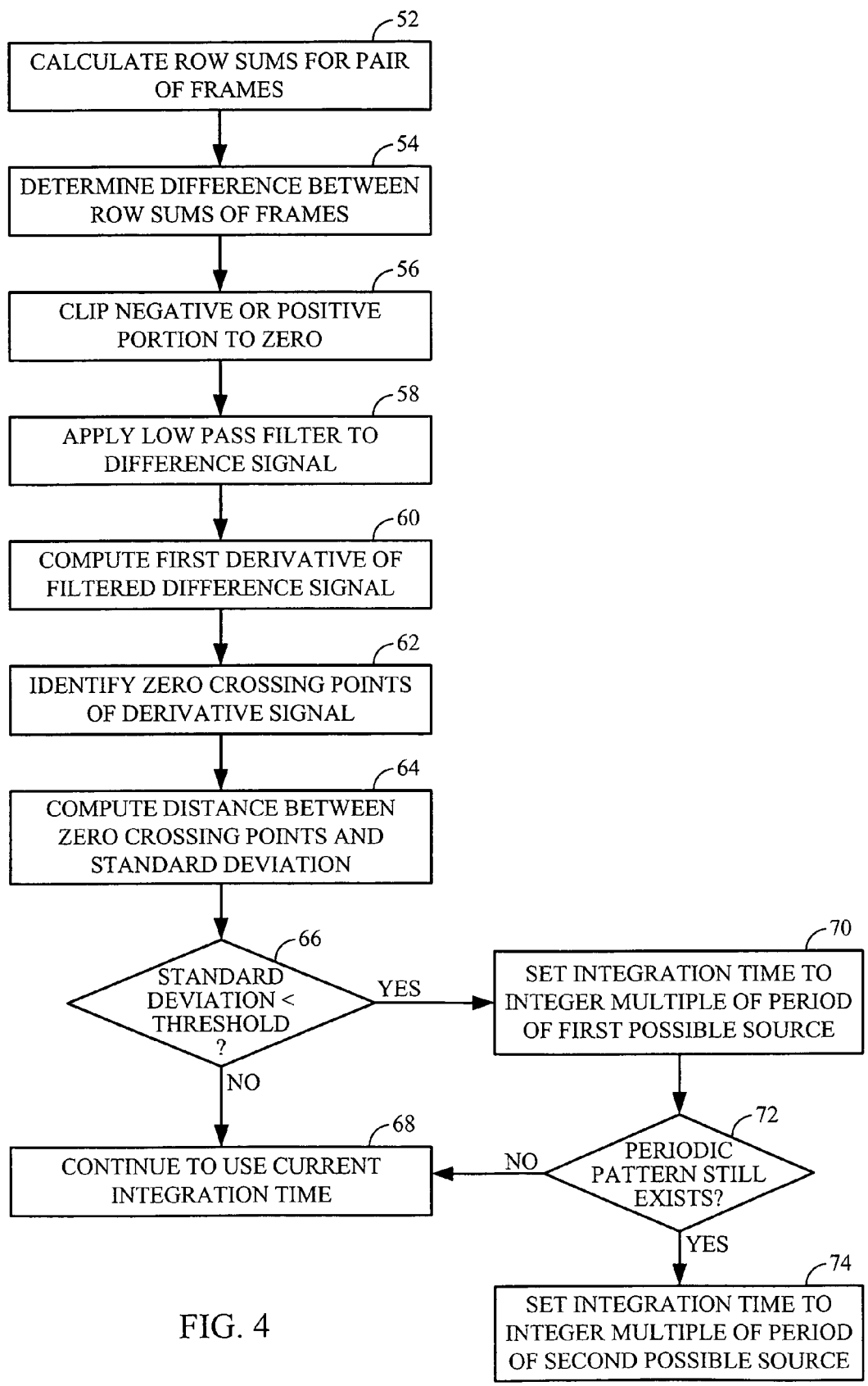
FIG. 4 is a flow diagram illustrating another technique for automatically detecting and correcting flicker.

FIG. 4 is a flow diagram illustrating another exemplary technique for detecting and correcting flicker. Flicker correction unit 16 of FIG. 2 may be configured to perform the technique of FIG. 4. Instead of determining the actual frequency of the illumination source, the technique of FIG. 4 simply determines whether a periodic pattern indicative of flicker exists. If so, flicker correction unit 16 selects different integration times (e.g., for 60 Hz or 50 Hz) until the periodic pattern is eliminated.

Row sum calculator 22 calculates row sums for a pair of frames captured by sensor array 12 (52). Row sum calculator 22 sums the intensity values across at least a portion of the sensor in at least a portion of the rows for both of the frames. Frame comparator 23 determines the differences between row sums of the two frames (54) and clips the negative or positive portion of the difference signal to zero (56). Flicker correction unit 16 applies low pass filter 24 to the difference signal generated by frame comparator 23 (58) to smooth the difference signal.

Derivative calculator 26 computes the derivative of the filtered difference signal (60). Flicker correction module 28 identifies the zero crossing points of the derivative signal (62), and computes the distances between the zero crossing points and the standard deviation of the distances between zero crossing points (64). Flicker correction module 28 compares the computed standard deviation to a threshold value to determine whether a periodic pattern indicative of flicker exists (66)

If the standard deviation is greater than the threshold value, no periodic pattern indicative of flicker exists and image capture device 10 continues to operate using the current integration time (68). If the standard deviation is less than the threshold value, however, a periodic pattern indicative of flicker exists. When a periodic pattern exists, flicker correction module 28 sends a flicker correction signal to set the integration time of capture control unit 14 to an integer multiple of the period of a first possible illumination source (70). Flicker correction module 28 may, for example, generate a flicker correction signal to set the integration time of capture control unit 14 to an integer multiple of the period of a 60 Hz illumination source, i.e., an integer multiple of 8.33 milliseconds.

Flicker detection module 16 determines whether the periodic pattern still exists using a pair of frames captured using the newly programmed integration time (72). Flicker detection module 16 determines whether the periodic pattern still exists using the first derivative of the difference signal computed for the new pair of frames. In particular, flicker detection module 16 may repeat the computations identified by he boxes labeled 52-66.

If no periodic pattern exists, image capture device 10 continues to use the current integration time (68). If the periodic pattern still exists, however, flicker correction module 28 sets the integration time of capture control unit 14 to an integer multiple of the period of a second possible illumination source, e.g., a 50 Hz illumination source (74). For example, flicker correction module 28 may send a signal to set the integration time of capture control unit 14 to an integer multiple of 10 milliseconds.

Figure 5:
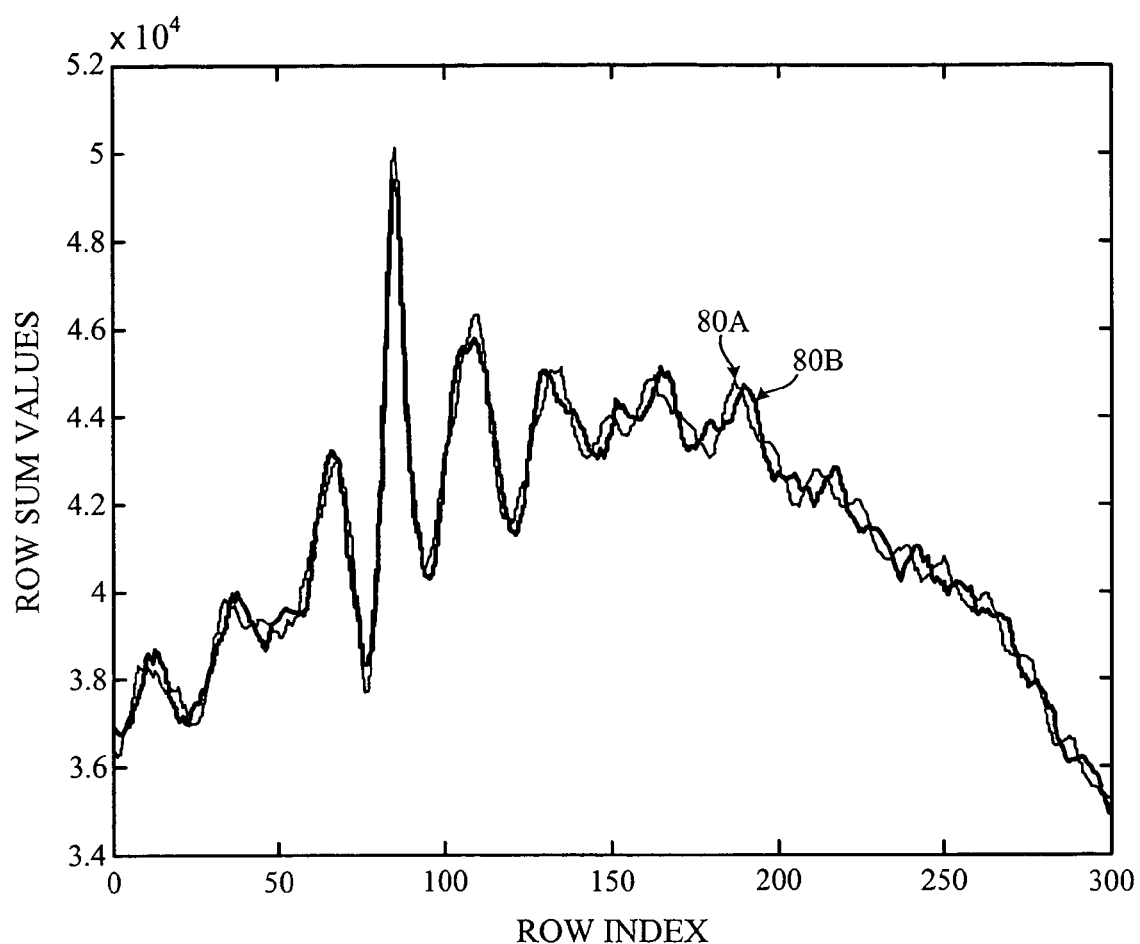
FIG. 5 is a graph illustrating exemplary row sum plots for two consecutive image frames.

FIG. 5 is a graph illustrating exemplary row sum plots 80A and 80B of two consecutive frames. Row sum plot 80A corresponds to the output of row sum calculator 22 for a first frame and row sum plot 80B corresponds to the output of row sum calculator 22 for a second frame. The first and second frames may be consecutive or non-consecutive frames obtained by image capture device 10, although consecutive frames may be preferred. In the graph illustrated in FIG. 5, each of the row sum data plots has 300 row sum data points. The x axis in FIG. 5 corresponds to a row index, which identifies the particular row or group of rows for each data point. The y axis in FIG. 5 corresponds to a row sum intensity value.

Each data point represents the row sum for a particular row or group of rows in sensor array 12. For a sensor array with 1200 rows, for example, row sum calculator 22 may compute row sums intensity (e.g., Y from YCbCr data) for groups of four rows, resulting in calculation of 300 row sum data points. If the sensor array is 1200 rows by 1200 columns, then each of the 300 rows includes 1200 pixels. As described above, to reduce the amount of computation performed by row sum calculator 22, a portion of the rows in the group may not be used in the row sum calculation. For a group of four rows in each row sum data point, row sum calculator 22 may sum the first two rows of the group and skip the other two rows of the group. In addition, row sum calculator 22 may use each of the sensor outputs in the row sum calculation or may only use a portion of the sensor outputs of sensor array 12.

Figure 6:
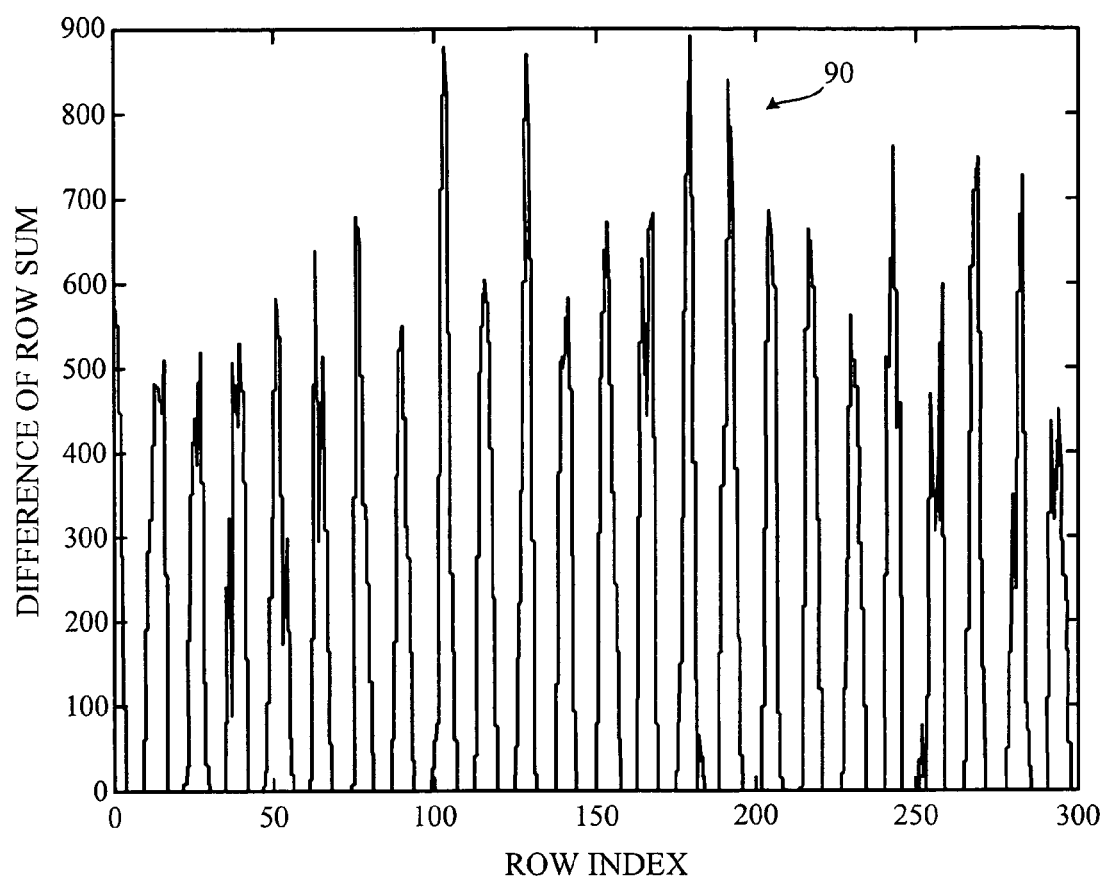
FIG. 6 is a graph illustrating an exemplary difference signal representing a difference between the frames of FIG. 5.

FIG. 6 is a graph illustrating an exemplary difference signal 90. Difference signal 90 is the result of subtracting row sum plot 80A from row sum plot 80B (FIG. 5) and clipping the negative portion of the signal to zero (36). In FIG. 6, the x axis corresponds to the row index, which identifies the particular row or group of rows for each data point. The y axis in FIG. 6 corresponds to the row sum difference intensity value.

Figure 7:
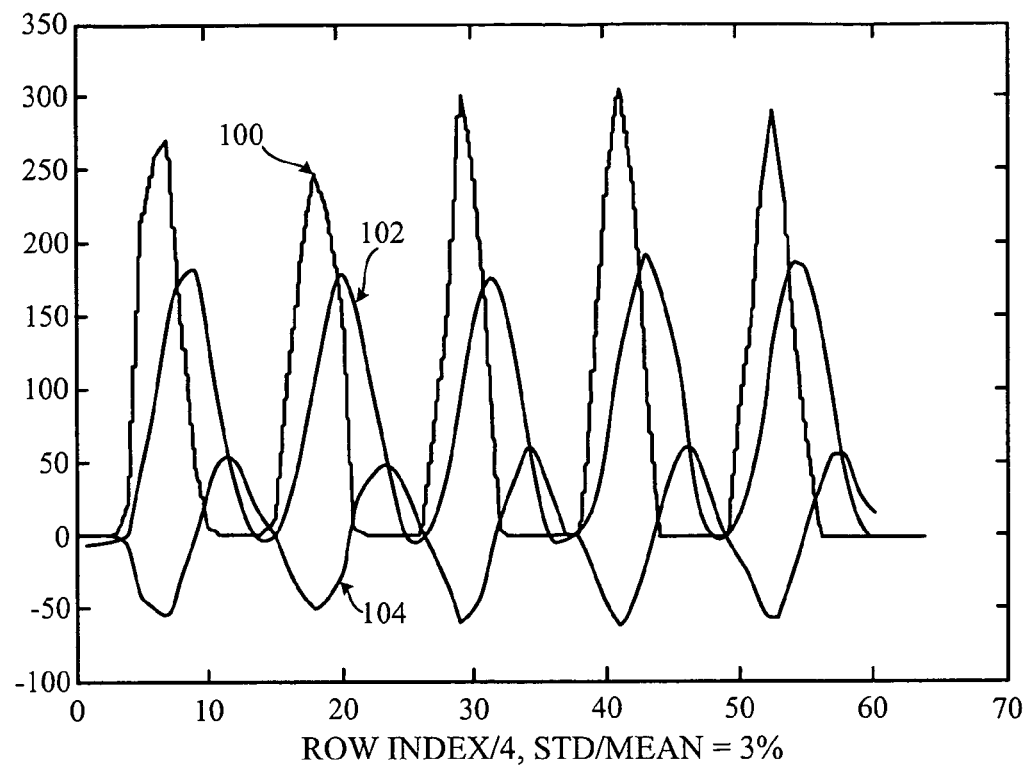
FIG. 7 is a graph illustrating a difference signal, a smoothed difference signal and a first derivative of the smoothed difference signal for an exemplary pair of image frames.

FIG. 7 is a graph illustrating an exemplary difference signal 100 of a viewfinder video frame that is subsampled from the original full frame, a smoothed difference signal 102 and a first derivative 104 of the smoothed difference signal for an exemplary pair of image frames. Difference signal 100 may be produced by frame comparator 23. Smoothed difference signal 102 may be produced by low pass filter 24. First derivative 104 may be produced by derivative calculator 26. The example imagery to which the signals in FIG. 7 correspond is a relatively simple image with little color and/or spatial detail. Difference signal 100 is a signal illustrating the difference between the row sum plots of two consecutive frames with negative values clipped to zero. Smoothed difference signal 102 is a signal illustrating the difference signal after application of low pass filter 24. Derivative signal 104 is the first derivative of smoothed difference signal 102.

As illustrated in FIG. 7, the zero crossing points of derivative signal 104 correspond to the peak values of smoothed difference signal 102. Flicker correction unit 16 corrects flicker in the frames using the distance between zero crossing points. In one embodiment, for example, flicker correction unit 14 computes the power frequency of the light source using the distances between the zero crossing points, and adjusts the integration time based on the computed frequency of the light source. In another embodiment, flicker correction unit 14 uses the standard deviation of the distance between the zero crossing points to determine whether there is periodic pattern, and adjusts the integration time until the periodic pattern no longer exists. In FIG. 7, the x axis corresponds to the row index divided by four, and the y axis corresponds to the row sum difference intensity value. In the example of FIG. 7, the standard deviation of the distance between zero crossing points is approximately three percent.

Figure 8:
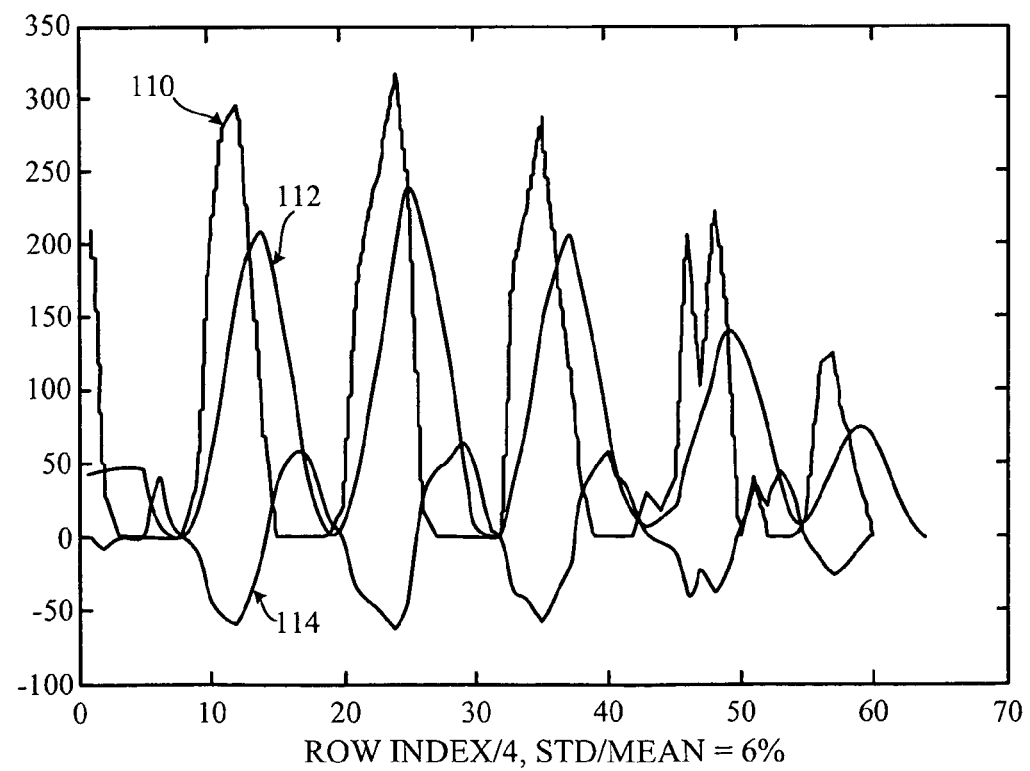
FIG. 8 is a graph illustrating a difference signal, a smoothed difference signal and a first derivative of the smoothed difference signal for another exemplary pair of image frames.

FIG. 8 is a graph illustrating a difference signal 110, a smoothed difference signal 112 and a first derivative 114 of the smoothed difference signal for another exemplary pair of viewfinder image frames. The image to which the signals correspond is a relatively complex image with significant color and spatial detail. Difference signal 110 is a signal illustrating the difference between the row sum plots of two consecutive frames of the image with negative values clipped to zero. Smoothed difference signal 112 is a signal illustrating the difference signal after application of low pass filter 24. Derivative signal 114 is the first derivative of smoothed difference signal 112. In FIG. 8, the x axis corresponds to the row index divided by four, and the y axis corresponds to the row sum difference intensity value. In the example of FIG. 8, the standard deviation of the distance between zero crossing points is approximately six percent.

The techniques described herein may be implemented in hardware, software, firmware, or any combination thereof. If implemented in software, the techniques may be directed to a computer-readable medium comprising program code providing machine-executable instructions, that when executed in a device that captures images, performs one or more of the techniques described herein. In that case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case a processor such as a micro processor or digital signal processor (DSP) may execute instructions stored in memory in order to carry out one or more of the techniques described herein. In some cases, the techniques may be executed by a DSP that invokes various hardware components. In other cases, the techniques described in this disclosure may be implemented by a microprocessor, one or more application specific integergrated circuits (ASICS), one or more field programmable gate arrays (FPGAs), or some other hardware-software combination.

Various embodiments of the disclosure have been described. These and other embodiments are within scope of the following claims.

The invention claimed is:

1. A method, implemented in an image capture device, comprising:

comparing a first image frame captured by an image capture device to a second image frame captured by the image capture device;
generating a difference signal based on the comparison;
clipping a positive portion or a negative portion of the difference signal;
computing a derivative of the difference signal;
determining distances between points of the derivative of the difference signal in order to determine a frequency of an illumination source; and
correcting flicker based on the determined frequency of the illumination source.

2. The method of claim 1, wherein the image capture device includes an array of image sensors, the method further comprising summing intensity values from at least some of the sensors in at least some rows of the array to produce row sum values for the first and second frames, and wherein comparing the first and second image frames includes comparing the row sum values for the first and second image frames.

3. The method of claim 1, further comprising applying a low pass filter to the difference signal to produce a filtered difference signal, wherein computing a derivative of the difference signal includes computing a derivative of the filtered difference signal.

4. The method of claim 1, wherein the image capture device includes an array of image sensors, and correcting flicker includes adjusting an integration time of the array of sensors based on the derivative of the difference signal.

5. The method of claim 1, wherein the image capture device includes an array of image sensors, and correcting flicker includes adjusting an integration time of the array of sensors based on the derivative of the difference signal.

6. The method of claim 5, wherein adjusting an integration time includes adjusting the integration time to be approximately equal to an integer multiple of a period of the illumination source.

7. The method of claim 1, wherein determining a frequency of an illumination source comprises:
determining the frequency of the illumination source as a function of the determined distances.

8. The method of claim 1, wherein correcting flicker comprises:
determining distances between zero crossing points of the derivative of the difference signal;
determining a standard deviation of the distances between the zero crossing points; and
determining whether flicker exists based on the standard deviation.

9. The method of claim 8, wherein correcting flicker includes, upon determining that flicker exists, adjusting an integration time of the array of sensors to an integer multiple of a period of a first possible illumination source.

10. The method of claim 9, further comprising adjusting the integration time of the array of sensors to an integer multiple of a period of a second possible illumination source if flicker continues to exist after adjustment of the integration time of the array of sensors to an integer multiple of a period of a first possible illumination source.

11. The method of claim 10, wherein the adjusting the integration time of the array of sensors to an integer multiple of a period of a first possible illumination source includes adjusting the integration time to an integer multiple of one of approximately 8.33 milliseconds and approximately 10 milliseconds, and wherein adjusting the integration time of the array of sensors to an integer multiple of a period of a second possible illumination source includes adjusting the integration time to an integer multiple of another of approximately 8.33 milliseconds and approximately 10 milliseconds.

12. The method of claim 1, wherein the first and second frames are consecutively captured by the image capture device.

13. The method of claim 1, wherein correcting flicker includes correcting flicker upon power up of an image capture device.

14. The method of claim 1, wherein correcting flicker includes correcting flicker periodically during operation of the image capture device.

15. A device comprising:
an image sensor array that captures a first image frame and a second image frame; and
a flicker correction unit that compares the first image frame to the second image frame, generates a difference signal based on the comparison, clips a positive portion or a negative portion of the difference signal, computes a derivative of the difference signal in order to determine a frequency of an illumination source, and corrects flicker based on the determined frequency of the illumination source.

16. The device of claim 15, wherein the sensor array includes an array of image sensors, and the flicker correction unit sums intensity values from at least some of the sensors in at least some rows of the array to produce row sum values for the first and second frames, compares the row sum values for the first and second image frames, and generates the difference signal based on the comparison of the row sum values.

17. The device of claim 15, wherein the filter correction unit includes a low pass filter that filters the difference signal to produce a filtered difference signal, wherein the derivative of the difference signal is a derivative of the filtered difference signal.

18. The device of claim 15, wherein the sensor array includes an array of image sensors, and the flicker correction unit adjusts an integration time of the array of sensors based on the derivative of the difference signal.

19. The device of claim 15, wherein the flicker correction unit determines a frequency of an illumination source based on the derivative of the difference signal, and corrects flicker based on the determined frequency of the illumination source.

20. The device of claim 15, wherein the sensor array includes an array of image sensors, and the flicker correction unit adjusts an integration time of the array of sensors based on the derivative of the difference signal.

21. The device of claim 20, wherein the flicker correction unit adjusts the integration time to be approximately equal to an integer multiple of a period of the illumination source.

22. The device of claim 15, wherein the flicker correction unit determines distances between zero crossing points of the derivative of the difference signal, and determines the frequency of the illumination source as a function of the computed distances.

23. The device of claim 15, wherein the flicker correction unit determines distances between zero crossing points of the derivative of the difference signal, determines a standard deviation of the distances between the zero crossing points, and determines whether flicker exists based on the standard deviation.

24. The device of claim 23, wherein the flicker correction unit, upon determining that flicker exists, adjusts an integration time of the array of sensors to an integer multiple of a period of a first possible illumination source.

25. The device of claim 24, wherein the flicker correction unit adjusts the integration time of the array of sensors to an integer multiple of a period of a second possible illumination source if flicker continues to exist after adjustment of the integration time of the array of sensors to an integer multiple of a period of a first possible illumination source.

26. The device of claim 25, wherein the flicker correction unit adjusts the integration time to an integer multiple of one of approximately 8.33 milliseconds and approximately 10 milliseconds, and adjusts the integration time to an integer multiple of another of approximately 8.33 milliseconds and approximately 10 milliseconds if flicker continues to exist.

27. The device of claim 15, wherein the first and second frames are consecutively captured by the sensor array.

28. The device of claim 15, wherein the flicker detection unit corrects flicker upon power up of the device.

29. The device of claim 15, wherein the flicker detection unit corrects flicker periodically during operation of the sensor array.

30. A method comprising:
comparing a first image frame captured by an image capture device to a second image frame captured by the image capture device;
generating a difference signal based on the comparison;
clipping a positive portion or a negative portion of the difference signal;
applying a low pass filter to the difference signal;
computing a first derivative of the filtered difference signal; and
correcting flicker in a third image frame captured by the image capture device based on the first derivative of the filtered difference signal.

31. A device comprising:
means for comparing a first image frame captured by an image capture device to a second image frame captured by the image capture device;
means for generating a difference signal based on the comparison;
means for clipping a positive portion or a negative portion of the difference signal;
means for applying a low pass filter to the difference signal;
means for computing a first derivative of the filtered difference signal; and
means for correcting flicker in a third image frame captured by the image capture device based on the first derivative of the filtered difference signal.

32. A non-transitory computer-readable medium comprising instructions to cause a processor to:
compare a first image frame captured by an image capture device to a second image frame captured by the image capture device;
generate a difference signal based on the comparison;
clip a positive portion or a negative portion of the difference signal;
compute a derivative of the difference signal;
determine distances between zero crossing points of the derivative of the difference signal in order to determine a frequency of an illumination source; and
correct flicker based on the determined frequency of the illumination source.

33. The computer-readable medium of claim 32, wherein the image capture device includes an array of image sensors, the instructions further causing the processor to sum intensity values from at least some of the sensors in at least some rows of the array to produce row sum values for the first and second frames, and wherein comparison of the first and second image frames includes comparison of the row sum values for the first and second image frames.

34. The computer-readable medium of claim 32, further comprising instructions to cause the processor to apply a low pass filter to the difference signal to produce a filtered difference signal, wherein computation of a derivative of the difference signal includes computation of a derivative of the filtered difference signal.

35. The computer-readable medium of claim 32, wherein the image capture device includes an array of image sensors, and the instructions cause the processor to adjust an integration time of the array of sensors based on the derivative of the difference signal to correct flicker.

36. The computer-readable medium of claim 32, wherein the instructions cause the processor to determine a frequency of an illumination source by determining the frequency of the illumination source as a function of the computed distances.

37. The computer-readable medium of claim 32, wherein the instructions cause the processor to:
determine distances between zero crossing points of the derivative of the difference signal;
determine a standard deviation of the distances between the zero crossing points;
determine whether flicker exists based on the standard deviation; and
upon determining that flicker exists, correct the flicker.

38. The computer-readable medium of claim 37, wherein the image capture device includes an array of image sensors, and wherein the instructions cause the processor to adjust the integration time of the array of sensors to an integer multiple of a period of a first possible illumination source if flicker exists, and adjust the integration time of the array of sensors to an integer multiple of a period of a second possible illumination source if flicker continues to exist after adjustment of the integration time of the array of sensors to an integer multiple of a period of the first possible illumination source.

39. The computer-readable medium of claim 32, wherein the first and second frames are consecutively captured by the image capture device.

40. The computer-readable medium of claim 32, wherein the instructions cause the processor to correct flicker upon power up of an image capture device, and periodically during operation of the image capture device.

* * * * *